(12) United States Patent
Yamane

(10) Patent No.: US 7,257,715 B2
(45) Date of Patent: *Aug. 14, 2007

(54) SEMICONDUCTOR INTEGRATED CIRCUIT

(75) Inventor: Ichiro Yamane, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 825 days.

This patent is subject to a terminal disclaimer.

(21) Appl. No.: 10/609,609

(22) Filed: Jul. 1, 2003

(65) Prior Publication Data

US 2004/0022089 A1 Feb. 5, 2004

Related U.S. Application Data

(63) Continuation of application No. 09/953,555, filed on Sep. 17, 2001, now Pat. No. 6,600,683.

(30) Foreign Application Priority Data

Jan. 24, 2001 (JP) .............................. P2001-15555

(51) Int. Cl.
*G06F 12/14* (2006.01)
*G06F 21/00* (2006.01)

(52) U.S. Cl. ...................................... 713/189; 365/195

(58) Field of Classification Search .................. 705/76, 705/77; 713/189
See application file for complete search history.

(56) References Cited

U.S. PATENT DOCUMENTS

| | | | |
|---|---|---|---|
| 4,445,177 A | 4/1984 | Bratt et al. | 712/245 |
| 5,015,884 A | 5/1991 | Agrawal et al. | 326/39 |
| 5,568,633 A | 10/1996 | Boudou et al. | 714/1 |
| 5,708,715 A * | 1/1998 | Vicard | 713/191 |
| 5,790,882 A | 8/1998 | Silver et al. | 712/37 |
| 6,067,633 A | 5/2000 | Robbins et al. | 711/141 |
| 6,222,382 B1 | 4/2001 | Jefferson et al. | 326/38 |
| 6,668,375 B1 * | 12/2003 | Leovac | 717/174 |

* cited by examiner

*Primary Examiner*—Matthew B Smithers
(74) *Attorney, Agent, or Firm*—McDermott Will & Emery LLP

(57) ABSTRACT

A semiconductor integrated circuit including one or a plurality of external functional blocks; a nonvolatile memory having a logical content as to whether to validate or invalidate the external functional blocks; and a logical circuit validating or invalidating an input and an output to each external functional block in accordance with the logical content of the memory, wherein a user is allowed to validate use of a necessary external functional block and to invalidate use of an unnecessary external functional block.

32 Claims, 5 Drawing Sheets

F I G. 5

```
mov #$55,@security_Adr
mov #$23,@security_Adr
mov #$FE,@security_Adr
mov #$36,@security_Adr      21
mov #$CD,@security_Adr
```

F I G. 6

```
mov #$55,@security_Adr       22
cmp d0,d1
mov #$12,d0
mov #$23,@security_Adr
mov #$FE,@security_Adr
add #$24,d0                  23
mov d0,@security_Adr
mov #$CD,@security_Adr
```

F I G. 8
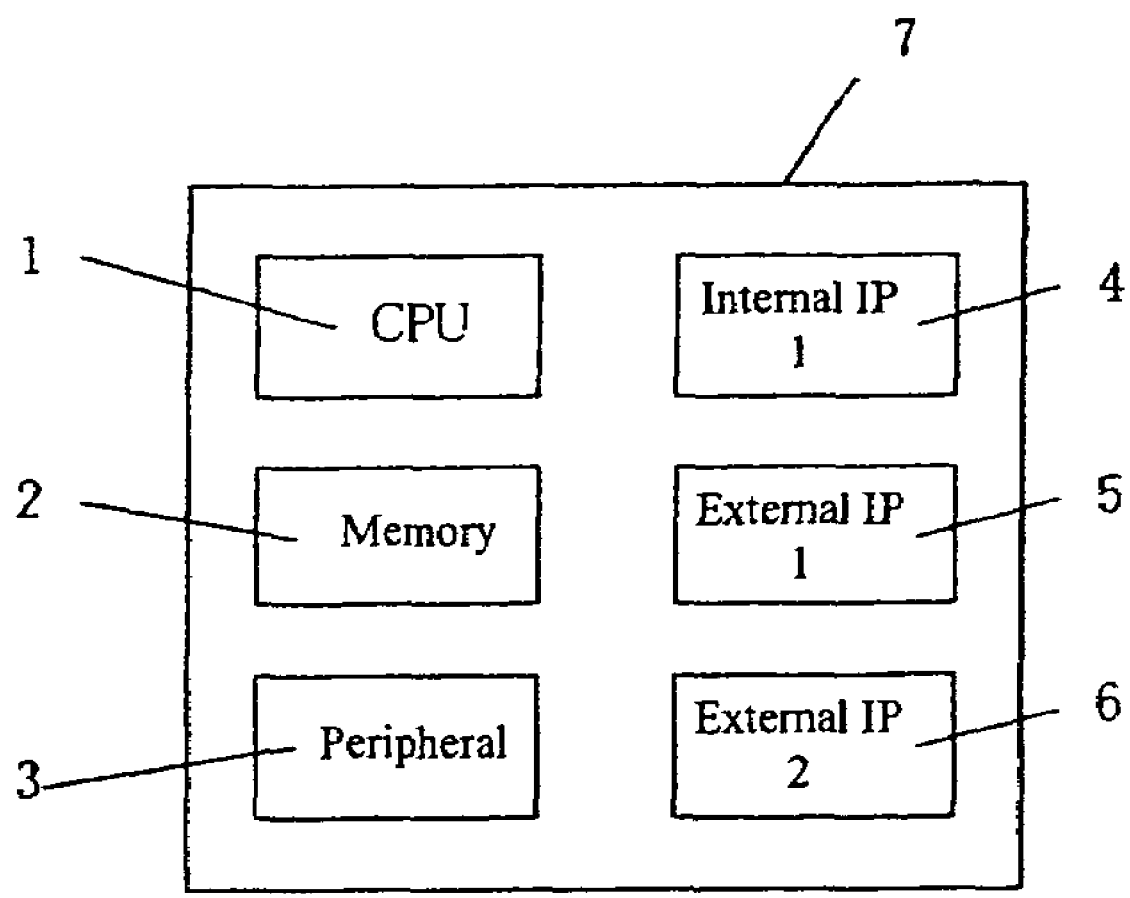

SEMICONDUCTOR INTEGRATED CIRCUIT

RELATED APPLICATION

The present invention is a continuation of U.S. patent application Ser. No. 09/953,555, filed Sep. 17, 2001 now U.S. Pat. No. 6,600,683.

BACKGROUND OF THE INVENTION

1. Field of the Invention

The present invention relates to a semiconductor integrated circuit (system LSI) incorporating therein a plurality of functional blocks and particularly relates to a semiconductor integrated circuit capable of validating or invalidating a plurality of functional blocks.

2. Description of the Related Art

In recent years, as circuits are increasingly made smaller in size or larger scaled, it becomes a mainstream in circuit design to use functional blocks.

As for functional blocks, when semiconductor integrated circuits are developed, not only internal functional blocks which can be freely used but also external functional blocks which require royalties are increasingly introduced.

With reference to FIG. 8, a semiconductor integrated circuit employing conventional functional blocks will be described. Reference numeral 7 denotes a semiconductor integrated circuit. The semiconductor integrated circuit 7 is comprised of a central processing unit (CPU) 1, a memory 2 for storing programs, a peripheral circuit 3, an internal functional block 4 held inside the circuit and freely usable, and external functional blocks 5 and 6 introduced from externally and requiring royalties.

The specification of the semiconductor integrated circuit 7 is determined in advance. The semiconductor integrated circuit 7 incorporates therein the necessary external functional blocks 5 and 6 depending on the specification of the circuit 7.

Necessary external functional blocks differ depending on each user. Accordingly, semiconductor integrated circuits 7 incorporating therein different external functional blocks are developed and manufactured, respectively.

That is, on the one hand, semiconductor integrated circuits each incorporating therein only the external functional block 5 are developed and manufactured independently.

On the other hand, semiconductor integrated circuits each incorporating therein only the external functional block 6 are developed and manufactured independently of the former semiconductor integrated circuits.

In some cases, semiconductor integrated circuits each incorporating therein both of the external functional blocks 5 and 6 are developed and manufactured.

In other words, various types of semiconductor integrated circuits are developed and manufactured.

In case of the conventional integrated circuits as stated above, it is necessary to develop and manufacture semiconductor integrated circuits having a plurality of types of specifications and different numbers of external functional blocks independent from one another.

For example, if a specification including both of the external functional blocks 5 and 6 is standard and a certain system does not require either one of the external functional blocks, it has been necessary to develop and manufacture a different semiconductor integrated circuit, or a semiconductor integrated circuit incorporating therein the unnecessary external functional block is manufactured and a user is charged for a royalty on the unnecessary external functional block.

As can be seen, it has been conventionally difficult to sufficiently satisfy both of the requirements of ensuring the versatility of semiconductor integrated circuits and optimizing royalty payments.

SUMMARY OF THE INVENTION

It is, therefore, a main object of the present invention to provide a semiconductor integrated circuit capable of ensuring the enhancement of versatility and the optimization of royalties.

The other objects, features and advantages of the present invention will be readily apparent from the description which follows.

A semiconductor integrated circuit according to the present invention comprises: one or a plurality of external functional blocks; switching means having a logical content as to whether to validate or invalidate each external functional block; and validating and invalidating means for validating or invalidating an input and an output to each external functional block in accordance with the logical content of the switching means.

According to the present invention, the validating and invalidating means can validate or invalidate the input and the output to each external functional block according to the logical content of the switching means.

Therefore, if a semiconductor integrated circuit manufacturer incorporates one or a plurality of external functional blocks in the semiconductor integrated circuit, a user can deal with a necessary external functional block by validating the use of the block and deal with an unnecessary external functional block by invalidating the use of the block.

As a result, if royalties on external functional blocks are charged, the user is charged the royalty on the external functional block set valid but not charged the royalty on the external functional block set invalid.

Consequently, the present invention can provide a semiconductor integrated circuit satisfying both a requirement to enhance versatility and to optimize royalty payment.

It is noted that the presence or absence of royalties is not necessarily essential in the present invention. If royalty payment is obligatory on users, the present invention can properly deal with it.

According to the present invention, the switching means preferably includes a memory for storing the logical content as to whether to validate or invalidate the input and the output to each external functional block.

According to the present invention, the memory is preferably a nonvolatile memory.

According to the present invention, the validating and invalidating means preferably includes a logical circuit for invalidating the input and the output to each external functional block if the logical content of the switching means is a content of invalidating the input and the output to each external functional block.

According to the present invention, the logical circuit preferably includes an AND gate for obtaining a logical product of the logical content and an input signal, and inputting the logical product into each external functional block.

BRIEF DESCRIPTION OF THE DRAWINGS

These and other objects as well as advantages of the invention will be become clear by the following description of preferred embodiments of the invention with reference to the accompanying drawings, wherein:

FIG. 5 is an explanatory view for a decryption program in the cryptanalytic circuit shown in FIG. 3;

FIG. 6 is an explanatory view for another decryption program in the cryptanalytic circuit shown in FIG. 3;

FIG. 8 is a block diagram of a conventional semiconductor integrated circuit.

In all these figures, like components are indicated by the same numerals.

DETAILED DESCRIPTION OF THE PREFERRED EMBODIMENTS

Figure 1:
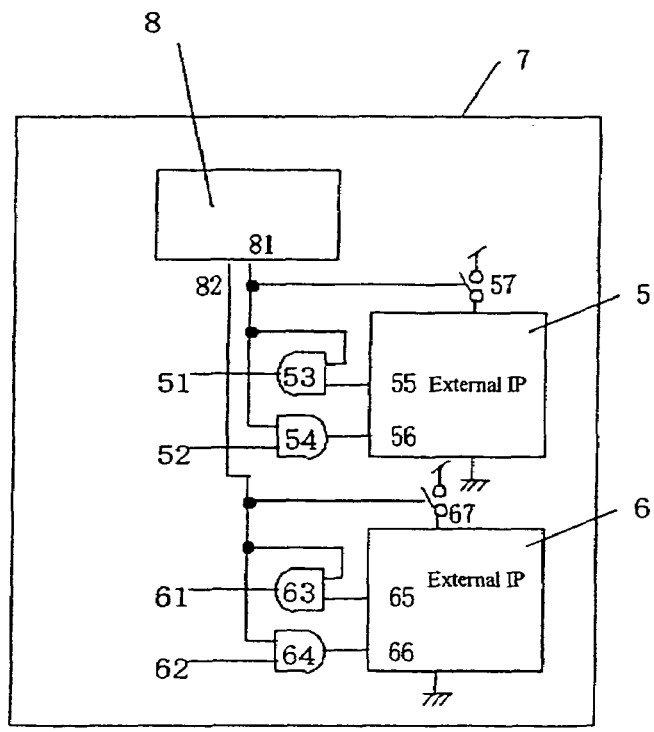
FIG. 1 is a block diagram of a semiconductor integrated circuit in one preferred embodiment according to the present invention.

The present invention will be described hereinafter based on the embodiments shown in the drawings in detail.

Referring to FIG. 1, a semiconductor integrated circuit 7 in a preferred embodiment according to the present invention includes two external functional blocks 5 and 6, a nonvolatile memory 8 serving as switching means, and AND gates 53 and 54 serving as validating/invalidating means. The switching means can be replaced by a memory other than the nonvolatile memory 8.

An input signal 52 inputted into the external functional block 5 is controlled by the logical content 81 of the nonvolatile memory 8 through the AND gate 54. If the logical content 81 of the nonvolatile memory 8 is, for example, "0", the input 56 of the external functional block 5 is fixed to "0", irrespectively of the value of the input signal 52. Namely, the input into the external functional block 5 is invalidated.

If the logical content 81 of the nonvolatile memory 8 is, for example, "1", the value of the input signal 52 is inputted into the input 56 of the external functional block 5. Namely, the input into the external functional block 5 is validated.

An output signal 51 is controlled by the logical content 81 of the nonvolatile memory 8 through the AND gate 53 serving as a logical circuit. If the logical content 81 of the nonvolatile memory 8 is, for example, "0", the output signal 51 is fixed to "0". Namely, the output from the external functional block 5 is invalidated.

If the logical content 81 of the nonvolatile memory 8 is, for example, "1", the value of the output 55 of the external functional block 5 is outputted to the output signal 51. Namely, the output from the external functional block 5 is validated.

As can be seen from the above, the input/output of the external functional block 5 can be made valid or invalid in a hardware depending on the logical content 81 of the nonvolatile memory 8.

As for the power supply of the external functional block 5, a GND is connected to a ground potential and a VDD is connected to a power supply potential through a switch 57. If the logical content 81 of the nonvolatile memory 8 is "1", then the switch 57 is turned ON and the external functional block 5 is supplied with power and activated.

If the logical content 81 of the nonvolatile memory 8 is "0", the switch 57 is turned OFF and no power is supplied to the external functional block 5. The output 55 of the external functional block 5 becomes a floating potential, however, since the logical content 81 of the nonvolatile memory 8 is "0" in the AND gate 53, an unnecessary through current does not flow in the AND gate 53.

Since the input 56 of the external functional block 5 is set at "0" by the AND gate 54 serving as the logical circuit, the ground potential is outputted. In addition, since the internal potential of the external block 5 is also fixed to the ground potential, an unnecessary through current does not flow in the external functional block 5. As a result, the consumption power of the external functional block 5 becomes zero and the consumption power of the semiconductor integrated circuit 7 can be suppressed as a whole.

The same thing is true for the external functional block 6. The input/output of the external functional block 6 can be made valid or invalid, depending on the logical content 82 of the nonvolatile memory 8.

As is obvious from the above, after manufacturing the semiconductor integrated circuit 7, it is possible to determine whether to validate or invalidate the external functional blocks 5 and 6, respectively. Due to this, it is possible that after a semiconductor integrated circuit incorporating therein a plurality of external functional blocks for general purposes is manufactured, only the external functional blocks which a user needs can be validated. In other words, at the time of shipping semiconductor integrated circuits from a factory, a logical content as to whether or not the external functional blocks 5 and 6 are validated is written to each nonvolatile memory 8. Further, the semiconductor integrated circuits are shipped to users after user information as to whom the semiconductor integrated circuits are shipped to, quantity and a validated external functional block are recorded. By doing so, a manufacturer can manage how many semiconductor integrated circuits are shipped to which user and which external block is validated before shipment and, therefore, manage royalties, as well.

Accordingly, while general purpose semiconductor integrated circuits can be mass-produced, it is possible to avoid paying a royalty on an unused external functional block.

It is noted that the nonvolatile memory 8 may be replaced by a fuse assembled into the semiconductor integrated circuit 7. This fuse is used as switching means and disconnected or connected without being molten depending on whether to invalidate or validate the input/output of the external functional blocks.

Further, the switching means may be constituted out of a mask option, such as a mask ROM, capable of setting a logical content to invalidate/validate the external functional blocks using a mask in a manufacturing phase.

The mask option, if applied, can completely prevent the logical content from being illegally rewritten and the external functional blocks from being illegally used while the nonvolatile memory cannot completely prevent these illegal actions.

Figure 2:
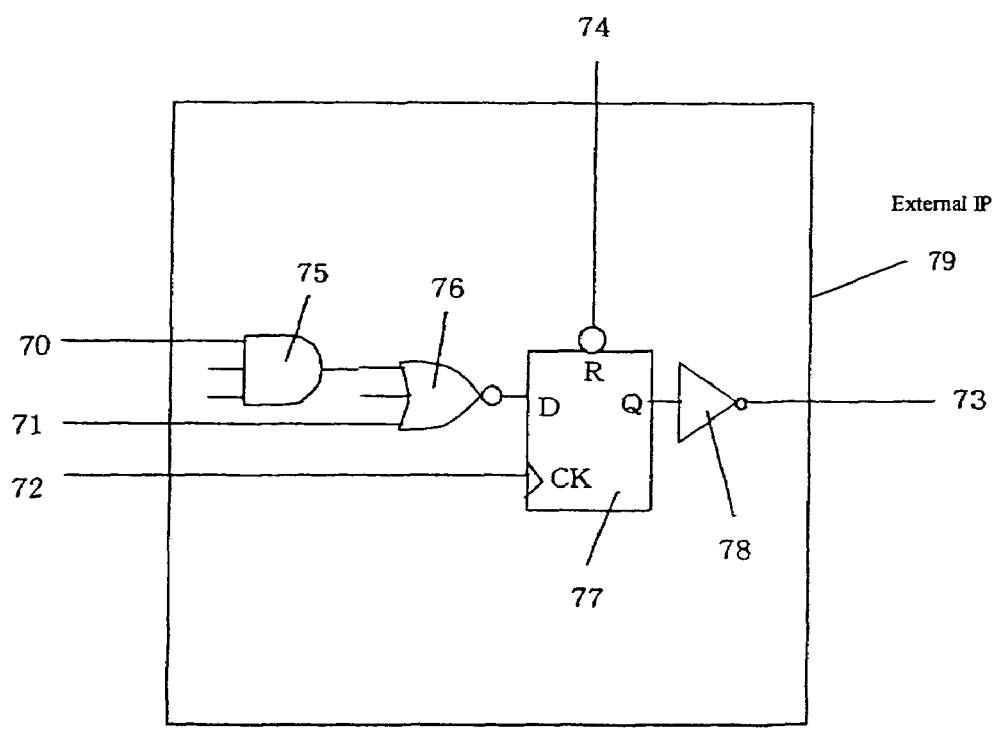
FIG. 2 is a block diagram of a validating and invalidating means in a semiconductor integrated circuit in another preferred embodiment according to the present invention.

With reference to FIG. 2, description will be given to an external functional block in a semiconductor integrated circuit in another preferred embodiment according to the present invention.

In FIG. 2, reference numeral 79 denotes an external functional block. The external functional block 79 consists of gates and a flip-flop. Instead of the flip-flop, a latch circuit may be used. The flip-flop, the latch or the like is generally referred to as latch means.

In this embodiment, the gate consists of an AND gate 75, a NOR gate 76, a NOT gate 78 and a flip-flop 77.

The flip-flop 77 is supplied with a clock (CK) from an input signal 72 if a control signal 74 is "1". The flip-flop 77 is supplied with data (D) through the AND gate 75 and the NOR gate 76 in accordance with input signals 70 and 71.

In addition, the flip-flop 77 outputs an output signal 73 from an output (Q) through the NOT gate 78.

That is, the flip-flop 77 operates in accordance with the input signals 70, 71 and 72 and obtains the output signal 73.

Here, if the control signal 74 is "0", the output (Q) of the flip-flop 77 is fixed to "0". The value "0" of the output (Q) is outputted as a fixed value "1" to the output signal 73 through the NOT gate 78. That is, the fixed value "1" is given to the output signal 73 irrespectively of the input signals 70, 71 and 72. As a result, the external functional block 79 is invalidated.

Figure 3:
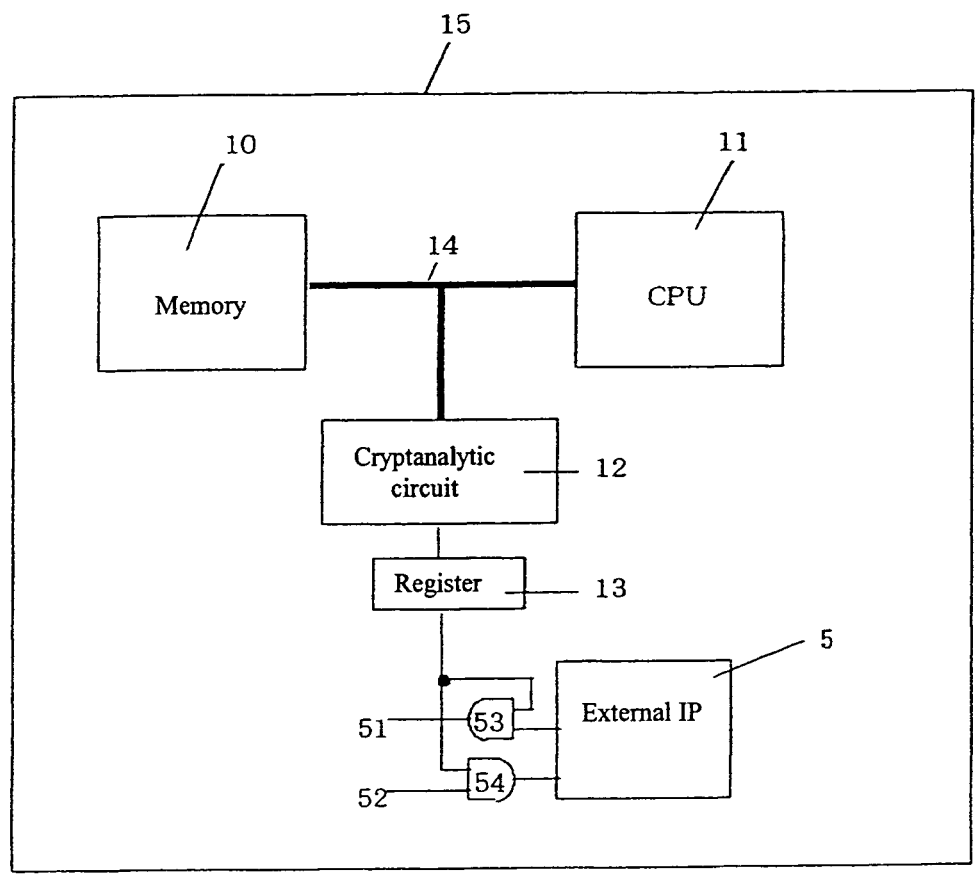
FIG. 3 is a block diagram of a semiconductor integrated circuit in yet another preferred embodiment according to the present invention.
Figure 4:
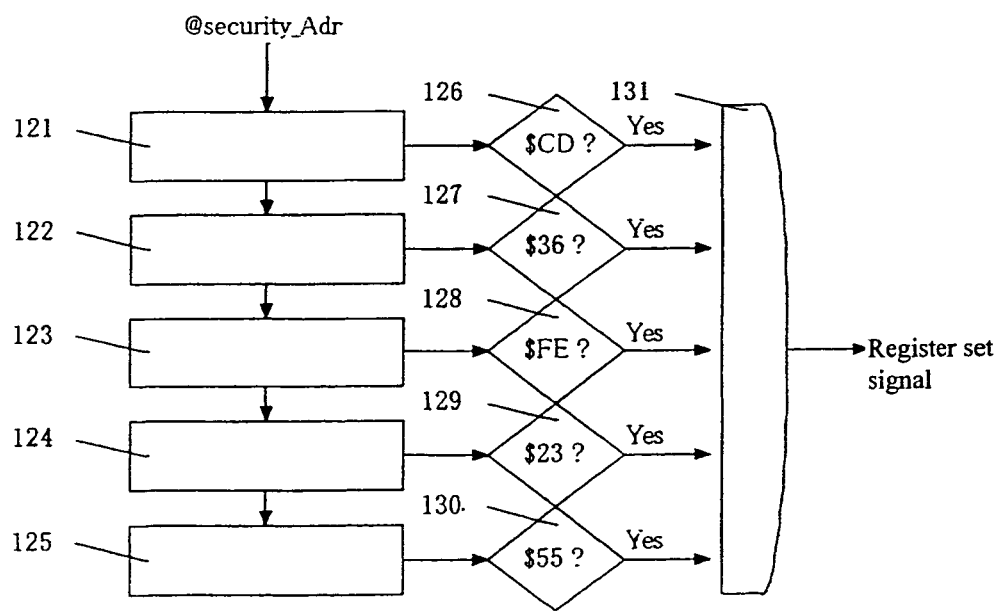
FIG. 4 is a block diagram of a cryptanalytic circuit shown in FIG. 3.

With reference to FIGS. 3 to 5, description will be given to a semiconductor integrated circuit in yet another embodiment according to the present invention. A semiconductor integrated circuit 15 shown therein includes a memory 10, a CPU 11, a cryptanalytic circuit 12, a register 13 and an external block 5 as well as two AND gates 53 and 54 validating or invalidating the external block 5 depending on the logical content of the register 13. The initial value of the register 13 is "0" in a disable output state and the external functional block 5 is set invalid.

After releasing the reset of the semiconductor integrated circuit 15, the CPU 11 reads and executes a program stored in the memory 10 through a bus 14. The memory 10 stores programs including a cryptanalytic program shown in FIG. 5. These programs are sequentially executed by the CPU 11.

If receiving instructions "$55", "$23", "$FE", "$36" and "$CD" in this order, the cryptanalytic circuit 12 sets the register 13 at "1".

FIG. 4 shows the internal constitution of the cryptanalytic circuit 12. Shift registers 121 to 125 store values when data is written at "@security_Adr" which is the address of the register. Comparators 126 to 130 compare values with those of the corresponding shift registers, respectively. If the value of the shift register is coincident with a preset fixed value of the corresponding comparator, the comparator outputs "1". If all the outputs of the comparators 126 to 130 are "1", an AND gate 131 sets the logical content of the register 13 at "1".

The CPU 11 reads and decrypts an instruction "mov#$55,@security_Adr" from the memory 10 and transmits an instruction "$55" to the cryptanalytic circuit 12 through the bus 14. The instruction "$55" is stored in the shift register 121. Next, the CPU 11 reads and decrypts an instruction "mov#$23,@security_Adr" from the memory 10 and transmits an instruction "$23" to the cryptanalytic circuit 12 through the bus 14. The instruction "$55" is stored in the shift register 122 and the instruction "$23" is stored in the shift register 121. Likewise, instructions "$FE", "$36" and "$CD" are transmitted to the cryptanalytic circuit 12. The shift register 125 stores the instruction "$55", the shift register 124 stores the instruction "$23", the shift register 123 stores the instruction "$FE", the shift register 122 stores the instruction "$36" and the shift register 121 stores the instruction "$CD".

It is assumed herein that the comparators 126 to 130 store "$55, $23, $FE, $36 and $CD" as fixed values in advance. If so, the comparison results of the comparators 126 to 130 are that all the values are coincident with those of the corresponding shift registers. Due to this, the AND gate 131 outputs a register set signal and the register 13 is thereby set at "1". Consequently, the external functional block 5 is validated.

With reference to FIG. 6, another decryption program will be described.

The decryption program shown in FIG. 5 is a simple enumeration of ordinary mov instructions with "@security__Adr" arranged regularly. Due to this, it is relatively easy for the third party to find out a decryption program part shown in FIG. 5 from main body programs and to cryptanalyze the decryption program.

To make it difficult for the third party to cryptanalyze the decryption program, instructions irrespective of decryption are purposely added to this regularly arranged program to so as to put the program into disorder.

To be specific, as shown in FIG. 6, an instruction 22, i.e., "cmp d0,d1" irrespective of the decryption program shown in FIG. 5 is added to the decryption program. Also, an instruction 21, i.e., "mov#$36,@security_Adr" is parsed to a string 23 of a plurality of instructions. From "mov#$12, d0" and "add#$24,d0", "$36" is formed in "d0" and this value is inputted into the cryptanalytic circuit 12 at "movd0, @security_Ard". Thus, even if the decryption program shown in FIG. 6 is inserted into the main body programs generated by a user, it is difficult to discern which part corresponds to the decryption part.

Namely, in the cryptanalytic circuit 12, the regularly arranged decryption program shown in FIG. 5 and the irregularly arranged decryption program shown in FIG. 6 difficult to decrypt provide an equivalent advantage. However, the difficulty of decryption as shown in the decryption program of FIG. 6 helps enhance a security effect.

Accordingly, a combination of the hardware-basis security given by the cryptanalytic circuit 12 and the software-basis security given by the decryption program shown in FIG. 6 greatly enhances the security effect.

Accordingly, it is possible to determine whether to validate or invalidate the external functional block 5 using the decryption program in the memory 10 after manufacturing the semiconductor integrated circuit 7. It is, therefore, possible to validate only the external functional block which the user needs after manufacturing the semiconductor integrated circuit incorporating therein a plurality of external functional blocks for general purposes.

An individual decryption program is issued to each user and managed by a manufacturer. In other words, user or shipment information, quantity and validated external functional blocks are recorded on a program and the program is shipped to each user before the reception of ROM data if the memory 10 is a mask ROM and after selling if the memory 10 is a nonvolatile memory. By doing so, the manufacturer can manage the quantities of semiconductor integrated circuits with respect to the respective users to who the semiconductor integrated circuits are shipped with information as to which external functional block is set valid, thereby making it possible for the manufacturer to rationally manage royalties. Hence, while semiconductor integrated circuits can be mass-produced for general purposes, it is possible to avoid paying royalties for unused external functional blocks.

Figure 7:
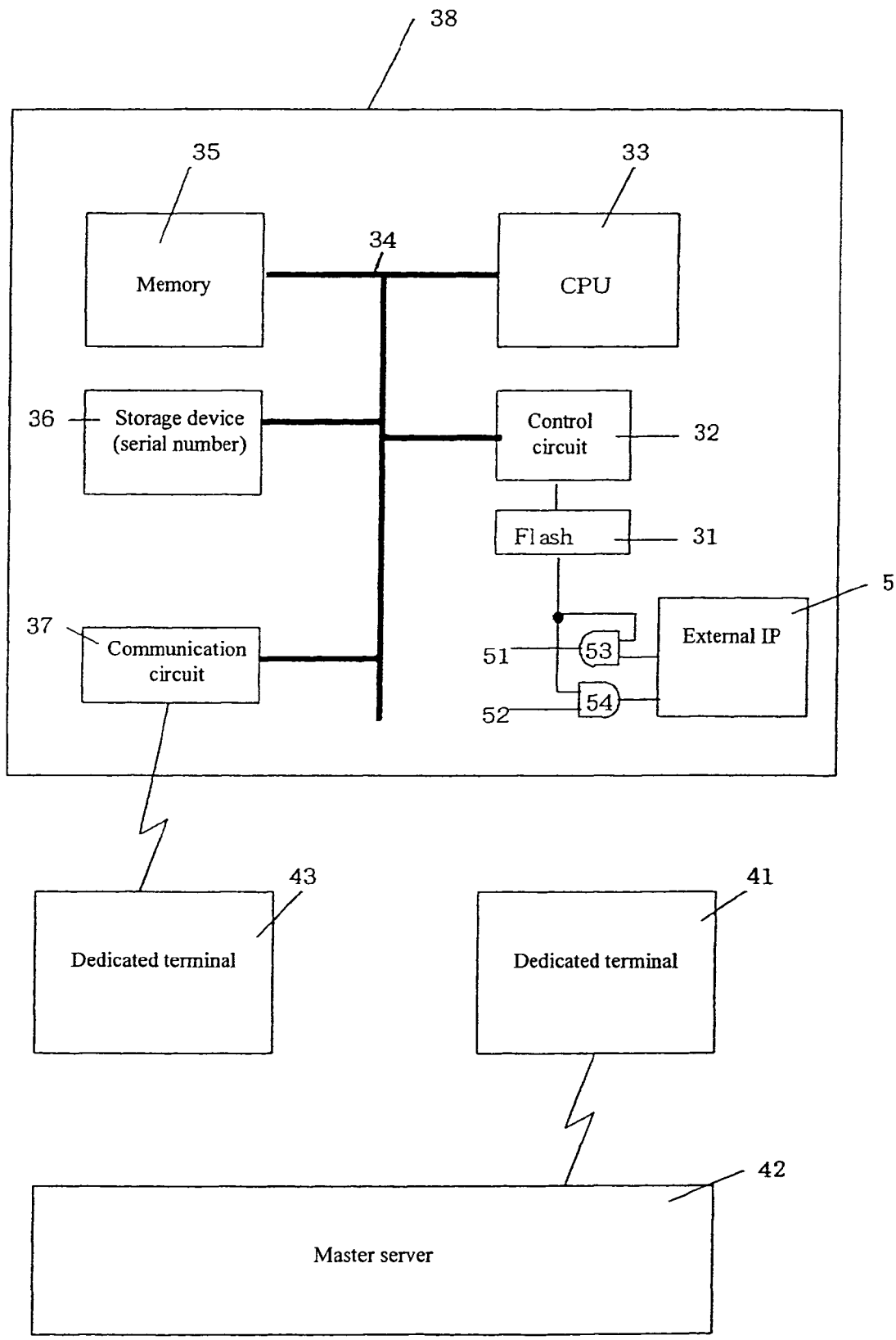
FIG. 7 is a block diagram of a semiconductor integrated circuit in yet another preferred embodiment according to the present invention.

With reference to FIG. 7, description will be given to a semiconductor integrated circuit in yet another preferred embodiment according to the present invention.

A semiconductor integrated circuit 38 shown in FIG. 7 includes an external functional block 5 as well as AND gates 53 and 54 switching the external functional block 5 to be valid or invalid depending on the logical content of a flash memory 31. The initial value of the flash memory 31 is set at "0" in a disable output state and the external functional block 5 is set invalid. If the semiconductor integrated circuit 38 is left as it is, the external functional block 5 in the semiconductor integrated circuit 38 cannot be used.

It is assumed herein that a serial number for specifying the semiconductor integrated circuit 38, e.g., "000982" is written to a storage device 36 serving as discrimination information storage means for storing discrimination information for specifying the semiconductor integrated circuit.

After purchasing the semiconductor integrated circuit 38, a user purchases a validating program for validating the external functional block 5 of this semiconductor integrated circuit 38 through the first dedicated terminal 41. The first dedicated terminal 41 is connectable to a master server 42 through communication means. The user inputs, as input information, user information, serial number information on, for example, 100 semiconductor integrated circuits 38 which the user purchased, e.g., "000901-001000" and discrimination information on the external functional block 5 which the user wants to be validated. The master server 42 calculates a selling price from the quantity of the semiconductor integrated circuits based on the inputted serial numbers of the circuits and the information on the external functional block 5 to be validated, and displays the calculated selling price on the first dedicated terminal 41. The user checks the selling price displayed and, if deciding to purchase the external functional block, inputs an order from the first dedicated terminal 41. The master server 42 settles the user information and the selling price and records the user information, the serial numbers, the quantity and information on the external functional block. Further, the master server 42 issues a validating program including a program having information ciphered according to the above-stated input information to the first dedicated terminal 41. The first dedicated terminal 41 downloads the validating program.

The user transfers the validating program thus downloaded to the second dedicated terminal 43 and connects the terminal 43 to the semiconductor integrated circuit 38.

In the semiconductor integrated circuit 38, the validating program is stored in the memory 35 as a result of the communication of the semiconductor integrated circuit 38 with the second dedicated terminal 43 and the CPU 33 reads and executes the validating program through a bus 34. First, the CPU 33 holds communication with the second dedicated terminal 43 through the communication circuit 37 serving as communication means for receiving the validating program ciphered using the SSL (Secure Socket Layer) and validating the functional block from the dedicated terminal 43. Then, the CPU 33 cryptanalyzes the serial number information and the information on the external functional block to be validated and obtains the serial number information "000901-00100" and the information on the external functional block 5 to be validated. The CPU 33 reads the serial number "000982" of the storage device 36 through the bus 34 and checks the serial number thus read with the externally obtained serial number information. If the serial number does not coincide with the conditions of the externally obtained serial number information, the CPU 33 finishes the program. If coincident, the CPU 33 actuates the control circuit 32 in accordance with the information on the external functional block to be validated. In this case, since the serial number "000982" coincides with the conditions of the serial number information "000901-001000", the control circuit 32 rewrites the flash memory 31 from "0" to "1" in accordance with information for validating the external functional block 5. As a result, the external functional block 5 can be validated.

As can be understood from the above, the external functional block 5 can be validated after manufacturing the semiconductor integrated circuit 38. Due to this, it is possible to manufacture the semiconductor integrated circuit 38 while incorporating therein a plurality of external functional blocks for general purposes and then to set only the external functional block which the user needs, valid.

An individual validating program is issued to each user from a manufacturer and managed by the master server 42. That is, by recording shipment or user information, quantity and information on the external functional block which has been set valid after purchase, the manufacturer can mange these pieces of information and, therefore, avoid paying royalties on unused external functional blocks.

The present invention can impart advantages to functional block providers designing functional blocks, silicon venders designing semiconductor integrated circuits using functional blocks and semiconductor integrated circuit users, respectively. For example, by manufacturing semiconductor integrated circuits each of which incorporates therein functional blocks A, B and C provided by functional block providers Company A, Company B and Company C, respectively, a silicon vender can develop high versatile semiconductor integrated circuits and greatly reduce the number of developers.

That is to say, if there are a user U1 who needs a semiconductor integrated circuit incorporating the functional blocks A and B therein and a user U2 who needs a semiconductor integrated circuit incorporating therein the functional blocks B and C, semiconductor integrated circuits satisfying the requirements of both the users U1 and U2 can be developed compared with a case where only the semiconductor integrated circuit can be developed for either the user U1 or U2 according to conventional development resources. This advantageously increases the profit of the silicon vender. Further, compared with the conventional case where the remaining one semiconductor integrated circuit cannot be developed and the vender cannot do business with one of the user, the present invention ensure that the vender can get such a business chance.

Moreover, only royalties on the functional blocks A and B are conventionally paid to the respective functional block providers by the user U1. According to the present invention, royalties on the functional blocks B and C are paid to the functional block providers by the user U2 besides the user U1. Hence, the present invention offers enormous practical advantages.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A semiconductor integrated circuit comprising:
   at least one external functional block;
   a validation circuit coupled to said external functional block and operative for rendering said external functional block operative or inoperative; and a control circuit coupled to said validation circuit and operative for forwarding an input signal to said validation circuit, said validation circuit rendering said external functional block operative or inoperative in accordance with the value of said input signal.

2. The semiconductor integrated circuit according to claim 1, wherein said control circuit comprises a memory device for permanently storing the value of said input signal.

3. The semiconductor integrated circuit according to claim 1, wherein said control circuit comprises a programmable fuse having a first state of operation and a second state of operation, said first state of operation producing a value of said input signal which renders said external functional block operative, said second state of operation producing a value of said input signal which renders said external functional block inoperative.

4. The semiconductor integrated circuit according to claim 3, wherein once said fuse is programmed to said first state of operation or said second state of operation, said fuse cannot be reprogrammed such that said value of said input signal is fixed.

5. The semiconductor integrated circuit according to claim 1, wherein said validation circuit comprises circuitry for disabling an input signal line of said external functional block and for disabling an output signal line of said external functional block, said input signal line and said output signal line being disabled when said external functional block is inoperative.

6. The semiconductor integrated circuit according to claim 1, wherein said validation circuit comprises circuitry for enabling an input signal line of said external functional block and for enabling an output signal line of said external functional block, said input signal line and said output signal line being enabled when said external functional block is operative.

7. The semiconductor integrated circuit according to claim 1, wherein said validation circuit comprising circuitry for preventing a power supply from being coupled to said external functional block when said external functional block is inoperative.

8. The semiconductor integrated circuit according to claim 1, wherein said validation circuit comprising circuitry for coupling a power supply to said external functional block when said external functional block is operative.

9. The semiconductor integrated circuit according to claim 1, wherein said control circuit comprises:
   a memory device for storing a decryption program;
   a processing unit for executing said decryption program;
   cryptanalyzing means for conducting cryptanalysis following execution of said decryption program by said processing unit; and
   a register for storing a cryptanalyzing result of said cryptanalyzing means, said result stored in said register corresponding to said value of said input signal.

10. The semiconductor integrated circuit according to claim 9, wherein said decryption program is prohibited from being read or accessed by a device external to the semiconductor integrated circuit.

11. The semiconductor integrated circuit according to claim 9, wherein said decryption program decrypts a cipher by setting values to a plurality of registers.

12. The semiconductor integrated circuit according to claim 11, wherein values for decrypting the cipher are generated by execution of said decryption program.

13. The semiconductor integrated circuit according to claim 12, wherein said input signal is generated by a control circuit comprising a programmable fuse having a first state of operation and a second state of operation, said first state of operation producing a value of said input signal equal to said first value, said second state of operation producing a value of said input signal equal to said second value.

14. The semiconductor integrated circuit according to claim 13, wherein once said fuse is programmed to said first state of operation or said second state of operation, said fuse cannot be reprogrammed such that said value of said input signal is fixed.

15. The semiconductor integrated circuit according to claim 12, further comprising the step of disabling an input signal line for each of said external functional blocks which are inoperative and disabling an output signal line for each of said external functional blocks which are inoperative.

16. The semiconductor integrated circuit according to claim 12, further comprising the step of enabling an input signal line for each of said external functional blocks which are operative and enabling an output signal line for each of said external functional blocks which are operative.

17. The semiconductor integrated circuit according to claim 12, further comprising the step of preventing a power supply from being coupled to each of said external functional blocks which are inoperative.

18. The semiconductor integrated circuit according to claim 12, further comprising the step of coupling a power supply to each of said external functional blocks which are operative.

19. The semiconductor integrated circuit according to claim 12, wherein said input signal is generated utilizing a control circuit comprising:
   a memory device for storing a decryption program;
   a processing unit for executing said decryption program;
   cryptanalyzing means for conducting cryptanalysis following execution of said decryption program by said processing unit; and
   a register for storing a cryptanalyzing result of said cryptanalyzing means, said result stored in said register corresponding to said value of said input signal.

20. The semiconductor integrated circuit according to claim 19, wherein said decryption program is prohibited from being read or accessed by a device external to the semiconductor integrated circuit.

21. The semiconductor integrated circuit according to claim 19, wherein said decryption program decrypts a cipher by setting values to a plurality of registers.

22. The semiconductor integrated circuit according to claim 21, wherein values for decrypting the cipher are generated by execution of said decryption program.

23. A method for activating external functional blocks contained in a semiconductor integrated circuit, said method comprising the steps of:
   determining which of a plurality of external functional blocks contained in said semiconductor circuit are to be operative, each of said external functional blocks having a corresponding validation circuit coupled thereto, said validation circuit operative for rendering said corresponding external functional block operative or inoperative;
   forwarding an input signal having a first value to each validation circuit coupled to an external functional block to be operative, said input signal having said first value controls said validation circuit such that said external functional block coupled thereto is operative;
   forwarding an input signal having a second value to each validation circuit coupled to an external functional block to be inoperative; said input signal having said second value controls said validation circuit such that said external functional block coupled thereto is inoperative; and recording each of said external functional blocks made operative so as to allow for determination of a royalty payment associated with said semiconductor integrated circuit.

24. The method according to claim 23, wherein once the value of said input signal corresponding to a given validation circuit and a given external functional block is determined, said value is permanently stored in a memory device.

25. A semiconductor integrated circuit, realizing a predetermined function with one or a plurality of external functional blocks, comprising:

a validation circuit operative for validating at least one of said external functional blocks operative or inoperative; and a control circuit, which is coupled to said validation circuit, operative for forwarding an input signal to said validation circuit, said validation circuit rendering said at least one of external functional block operative or inoperative in accordance with the value of said input signal.

26. The semiconductor integrated circuit according to claim 25, wherein said control circuit comprises a memory device for storing the value of said input signal.

27. The semiconductor integrated circuit according to claim 25, wherein said control circuit comprises:

a memory device for storing a decryption program;

a processing unit for executing said decryption program;

cryptanalyzing means for conducting cryptanalysis following execution of said decryption program by said processing unit; and a register for storing a cryptanalyzing result of said cryptanalyzing means, said result stored in said register corresponding to said value of said input signal.

28. The semiconductor integrated circuit according to claim 27, wherein said decryption program is prohibited from being read or accessed by a device external to the semiconductor integrated circuit.

29. The semiconductor integrated circuit according to claim 27, wherein said decryption program decrypts a cipher by setting values to a plurality of registers.

30. The semiconductor integrated circuit according to claim 29, wherein values for decrypting the cipher are generated by execution of said decryption program.

31. The semiconductor integrated circuit according to claim 25, further comprising a switching means including a memory storing the logical content for validating or invalidating an input to said at least one external functional block.

32. The semiconductor integrated circuit according to claim 25, further comprising a switching means including a memory storing the logical content for validating or invalidating an output to said at least one external functional block.

* * * * *